US012679675B2

(12) United States Patent
Zeitler

(10) Patent No.: US 12,679,675 B2
(45) Date of Patent: Jul. 14, 2026

(54) DISCHARGE SYSTEM FOR DISCHARGING CONVEYED GOODS

(71) Applicant: Loibl Forderanlagen GmbH, Straubing (DE)

(72) Inventor: Karl Zeitler, Ergoldsbach (DE)

(73) Assignee: Loibl Forderanlagen GmbH, Straubing (DE)

( * ) Notice: Subject to any disclaimer, the term of this patent is extended or adjusted under 35 U.S.C. 154(b) by 124 days.

(21) Appl. No.: 18/650,705

(22) Filed: Apr. 30, 2024

(65) Prior Publication Data

US 2024/0367927 A1    Nov. 7, 2024

(30) Foreign Application Priority Data

May 3, 2023    (DE) .......................... 202023102387.8

(51) Int. Cl.
 *B65G 65/42* (2006.01)

(52) U.S. Cl.
 CPC .......... *B65G 65/42* (2013.01); *B65G 2201/04* (2013.01); *B65G 2203/0241* (2013.01)

(58) Field of Classification Search
 CPC .. B65G 65/40–48; B65G 65/4881–489; B65G 47/19; B65G 47/44; B65D 88/68
 USPC ................................................. 222/280, 281
 See application file for complete search history.

(56) References Cited

U.S. PATENT DOCUMENTS 2,676,694 A * 4/1954 Wyss ..................... B65G 65/00
198/534
2,688,393 A * 9/1954 Uschmann ............. B65G 65/00
198/611
3,315,795 A * 4/1967 Ross, Jr. ................ B65G 65/42
198/316.1
3,512,683 A * 5/1970 Frisbie ................... B02C 11/04
222/267
4,173,177 A * 11/1979 Davis ........................ B02C 4/40
99/628
4,189,240 A * 2/1980 Scheppele ............ A23N 17/007
366/186

(Continued)

FOREIGN PATENT DOCUMENTS

DE          19545419 C2 *  3/2000 ............. B65G 47/19
KR      200389417 Y1      7/2005

(Continued)

OTHER PUBLICATIONS

European Search Report dated Aug. 29, 2024 Office Action.

*Primary Examiner* — Joseph A Dillon, Jr.

(74) *Attorney, Agent, or Firm* — WELSH FLAXMAN & GITLER LLC

(57)    ABSTRACT

The invention relates to a discharge system for discharging conveyed goods, in particular electrical and electronic scrap, from a bunker container, including a receiving hopper for receiving conveyed goods from the bunker container with an upper feed opening and a lower discharge opening located opposite the same, at least one, preferably horizontal, conveying device arranged underneath the discharge opening, for conveying away the conveyed goods exiting from the discharge opening of the receiving hopper, and a pressure relief and metering device for relieving the pressure in the receiving hopper and for metering and/or separating the conveyed goods.

12 Claims, 2 Drawing Sheets

(56)                References Cited

U.S. PATENT DOCUMENTS

| | | | | |
|---|---|---|---|---|
| 4,363,341 A | * | 12/1982 | Powell | A01G 9/081 |
| | | | | 141/183 |
| 4,436,226 A | * | 3/1984 | Aggen | A01C 15/122 |
| | | | | 222/282 |
| 4,465,239 A | * | 8/1984 | Woten | B65G 53/46 |
| | | | | 406/64 |
| 4,499,909 A | * | 2/1985 | Seragnoli | A24C 5/1835 |
| | | | | 131/108 |
| 4,504,182 A | * | 3/1985 | Burkner | B27N 3/146 |
| | | | | 222/281 |
| 4,699,049 A | * | 10/1987 | Mizer | A23N 5/00 |
| | | | | 19/35 |
| 5,176,295 A | | 1/1993 | Stefanik | |
| 5,327,947 A | * | 7/1994 | McGregor | B65B 1/12 |
| | | | | 141/73 |
| 5,735,386 A | * | 4/1998 | Epp | B65G 65/42 |
| | | | | 198/550.1 |
| 5,788,163 A | * | 8/1998 | Woten | B05B 7/1409 |
| | | | | 358/1.14 |
| 5,829,649 A | * | 11/1998 | Horton | B02C 13/288 |
| | | | | 406/135 |
| 6,109,488 A | * | 8/2000 | Horton | E04F 21/12 |
| | | | | 406/137 |
| 6,161,784 A | * | 12/2000 | Horton | A01C 15/007 |
| | | | | 239/650 |
| 6,786,438 B2 | * | 9/2004 | Winn | D01G 9/04 |
| | | | | 241/73 |
| 6,976,819 B2 | * | 12/2005 | Kulbeth | B65G 65/46 |
| | | | | 414/326 |
| 7,021,469 B2 | * | 4/2006 | Romagnoli | B65G 47/19 |
| | | | | 209/244 |
| 7,308,734 B2 | * | 12/2007 | Mizer, Sr. | D01B 1/04 |
| | | | | 19/41 |
| 7,614,120 B2 | * | 11/2009 | Isbell | B07B 1/28 |
| | | | | 19/41 |
| 7,758,294 B2 | * | 7/2010 | Maguire | B65G 21/2081 |
| | | | | 414/722 |
| 8,778,084 B2 | * | 7/2014 | Nguyen | C13K 13/00 |
| | | | | 366/151.1 |
| 9,440,804 B2 | * | 9/2016 | Lopes | B65G 47/19 |
| 10,124,968 B2 | * | 11/2018 | Zotti | F23J 1/02 |
| 10,231,377 B2 | * | 3/2019 | Gray | A01C 7/126 |
| 11,279,568 B2 | * | 3/2022 | Ramosevac | B01F 35/71815 |
| 11,801,993 B1 | * | 10/2023 | Reed | B65G 65/4881 |
| 2010/0287899 A1 | * | 11/2010 | Mackin | A01F 12/46 |
| | | | | 56/10.2 R |
| 2017/0181371 A1 | * | 6/2017 | Gray | A01C 7/125 |

FOREIGN PATENT DOCUMENTS

| | | | | |
|---|---|---|---|---|
| KR | 20240167219 A | * | 11/2024 | B65G 65/42 |
| RU | 2379099 C2 | * | 1/2010 | H05B 3/0009 |
| WO | 2018081844 A1 | | 11/2017 | |

* cited by examiner

DISCHARGE SYSTEM FOR DISCHARGING CONVEYED GOODS

BACKGROUND OF THE INVENTION

The invention relates to a discharge system for discharging conveyed goods, in particular electrical and electronic scrap, from a bunker container. Using the discharge system according to the invention, the conveyed goods may be removed from the bunker container uniformly and in a metered fashion, despite poor or difficult flow properties, and then a predefined amount of conveyed goods may be provided to subsequent handling or processing or workstations, such as sorting and/or processing systems, shredders or crushing plants or melting furnaces with different heat or temperature zones.

PRIOR ART

In all areas of industry, conveyed goods or materials—including those with difficult flow properties—need to be conveyed, stored, and unloaded, sometimes in fully automatic operation. Bunkers or bunker containers are often used for receiving, storing, and uniformly transferring different conveyed goods or materials, as they have a large capacity and the conveyed goods they have received may be released again. In order to achieve a metered and uniform delivery of the conveyed goods, the widest variety of discharge systems are used in practice, depending on the conveyed goods and the shape of the bunker. If, for example, the conveyed goods are bulk material, such as crushed stone, gravel, sand, gypsum, cement, slag, pellets, or wood chips, the discharge of the bulk material through a discharge system substantially depends on factors such as the bulk material density, grain size, grain shape, moisture, and other parameters.

This type of device for discharging bulk material, in particular powdery or fine-grained material, from a container is known, for example, from German Patent No. DE 2642002 A1. The device has a container for receiving the powdered or fine-grained material, which is equipped at the bottom with a grate made of grate bars arranged parallel and horizontally. The two or more grate bars preferably have an angular cross-section and are mounted to be rotatable in the container, wherein the grate bars are drivable with torsional vibration in the same direction and at the same frequency on the one hand, and on the other hand the grate bars are individually drivable or drivable in groups with different oscillation amplitudes or amplitudes, wherein the different oscillation amplitudes are preferably achieved by crank arms with different lengths. Due to the differently sized gap widths thereby achieved between the grate bars, the throughput volumes differ in the area of the individual grate bars, which leads, among other things, to the disruption of the existing layers of bulk material in the container. Using the grate bars thus ensures a mixing of the layers of bulk material on the one hand and a metering of the bulk material on the other. In contrast, in the rest position or starting position, the grate bars are positioned in such a way that no bulk material may trickle through between the grate bars, i.e., the grate bars form a type of container closure in the starting position.

Furthermore, a silo for gassing bulk material is disclosed in European Patent No. 3535203 B1, comprising a container for receiving bulk material with an inlet and an outlet, and at least one valve slide, which is arranged in the container between the inlet and the outlet and is designed to allow a predefined quantity of bulk material per time unit to flow in a flow direction from the inlet to the outlet. Furthermore, a gas inlet opening is provided on the container for introducing gas into the container, and one or more gas outlet openings are provided on the container for discharging the gas, wherein the gas flows through the container substantially counter to the flow direction of the bulk material. Due to its application on the bulk material, the same may be dried, cooled, or pretreated, for example. Two or more valve slides are preferably provided, which are arranged in such a way that they lie adjacent and parallel to one another in a horizontal plane. The valve slides are thereby designed as elongated profile bodies, preferably tubular or solid profiles, with a non-round or angular cross-section and may be driven to oscillate about their longitudinal axis, wherein the clumping of the bulk material in the container may be reduced, or already existing clumps may be separated again by the oscillating movement. However, the valve slides also function to completely shut off the flow of bulk material at the outlet or to close the outlet.

In addition to the discharge of conveyed goods through a tilting or rotary beam floor, dosing screws, often with vibration support, are primarily used in practice. Even if these discharge systems are well suited for discharging bulk goods, these discharge systems have major problems with or simply are not suitable for conveyed goods, such as electrical and electronic scrap, which have extremely difficult flow properties.

In the case of electrical and electronic scrap ("e-scrap" or "e-waste" for short), which, for example, may comprise electronic components such as printed circuit boards or circuit boards, etc., the electronic components in the bunker container or bunker regularly hook into each other and/or larger clumps or tangles form. Larger clumps or tangles, and also the variety of electronic components, which generally differ in size, dimensions, and nature, regularly lead to bridging or jamming and wedging of the conveyed goods in the area of the discharge opening of the bunker during unloading of the bunker, which causes disturbances in the conveyor system. The discharge opening is thereby partially or even completely clogged by the conveyed goods. A partial or complete clogging of the discharge opening also causes the back pressure in the bunker to increase. The metering accuracy presents another problem, which may only be guaranteed to a limited extent in the case of conveyed goods with poor flow properties, such as electrical and electronic scrap. Furthermore, when conveying the conveyed goods away by means of a conveying device, this may lead to conveyed goods that are still partially hooked into one another and clumps form as a result. This then leads to the conveyed goods breaking off in clumps or in large pieces in the output area of the conveyor device. The metering accuracy of the discharge system suffers in turn when these clumps or associations of conveyed goods, some of which are very heavy, fall from the conveying device.

SUMMARY OF THE INVENTION

It is therefore the object of the present invention to provide a novel discharge system that overcomes the disadvantages of the prior art. The discharge system according to the invention should guarantee a uniform and continuous flow of material or conveyed goods and the highest possible metering accuracy, and additionally be robust and resistant to external influences. This object is achieved according to the invention by a discharge system according to claim 1.

Further advantageous aspects, details, and embodiments of the invention result from the dependent claims, the description, and the drawings.

The discharge system according to the invention for discharging conveyed goods, in particular electrical and electronic scrap, from a bunker container, comprises a receiving hopper for receiving conveyed goods from the bunker container with an upper feed opening and a lower discharge opening located opposite the same, at least one, preferably horizontal, conveying device arranged underneath the discharge opening, for conveying away the conveyed goods exiting from the discharge opening of the receiving hopper, and a pressure relief and metering device for relieving the pressure in the receiving hopper and for metering and/or separating the conveyed goods. The pressure relief and metering device thereby have at least one first beam-shaped metering element and one second beam-shaped metering element, which are arranged in the receiving hopper between the feed opening and the discharge opening, in particular in the area above the discharge opening, wherein the first beam-shaped metering element is motor-driven about a first longitudinal axis and the second beam-shaped metering element is motor-driven about a second longitudinal axis, namely preferably independently of one another, and wherein the first and second beam-shaped metering elements are arranged at a horizontal distance from each other at different height levels in the receiving hopper.

One particular advantage of the discharge system according to the invention may be seen in the fact that, due to the specific design of the pressure relief and metering device, a continuous and uniform flow of conveyed goods or material flow out of the discharge opening of the receiving hopper is achieved. In particular, the conveyed goods may be discharged continuously across the entire discharge opening or the entire discharge cross-section of the receiving hopper while the bunker is being discharged due to the pressure relief and metering device according to the invention. So-called "dead zones", in which the conveyed goods no longer move, and consequently reduce the usable discharge cross-section, may thus be effectively avoided.

For this purpose, at least one first beam-shaped metering element and one second beam-shaped metering element are provided, which are respectively motor-driven about their longitudinal axes and are arranged inside the receiving hopper in such a way that they are located at different height levels at a horizontal distance from one another. Starting from a horizontal plane, which may be formed by the floor surface or by the horizontally running transport plane of the conveyor device, the beam-shaped metering elements have different height levels or positions, i.e., the first metering element lies at a first height, while the second metering element lies at a second height, wherein the height of the first metering element is lower than the height of the second metering element, or vice versa. Consequently, the conveyed goods or the flow of conveyed goods at different heights or layer heights may be influenced by the motor-driven metering elements arranged at different height levels, by which means the generation of "dead zones" or bridging is effectively prevented so that a continuous conveying of the conveyed goods is possible.

Furthermore, the first and second metering elements are arranged at a distance from one another in the horizontal direction, wherein the distance may be selected depending on the type, size, and nature of the conveyed goods and/or the size of the metering element and/or the size and design of the receiving hopper and the size of the discharge opening. The horizontal distance between the two metering elements preferably corresponds to at least that of the cross-section of one metering element. However, the horizontal distance between the first and second metering elements may also be greater and, for example, corresponds to twice or three times the cross-section of one metering element.

The amount of conveyed goods that fall through the discharge opening onto the conveyor device is significantly influenced by the horizontal distance between the metering elements, i.e., the greater the horizontal distance between the two metering elements, the larger the quantities of conveyed goods that may flow or run through between the metering elements per unit of time.

In addition to the metering elements located at different height levels and the horizontal spacing of the metering elements from one another, the turning or rotational movement of the metering elements is decisive for the fact that using the metering elements may have an active effect on the conveyed goods flow, which runs or flows from the feed opening in the direction of the discharge opening. Due to the active influencing of the conveyed goods flow at different heights or layer heights, already existing clumps of conveyed goods or tangles of conveyed goods may be at least partially loosened or broken up, or components that are hooked into one another may be separated or isolated. The goal is that a uniform and continuous flow of conveyed goods is discharged at the discharge opening of the receiving hopper, preferably across the entire discharge cross-section. This is the only way that defined amounts of conveyed goods may be supplied per unit of time to subsequent treatment or workstations.

In one preferred embodiment, the pressure relief and metering device have at least one third beam-shaped metering element and/or further beam-shaped metering elements. More than two beam-shaped metering elements may be provided depending on the conveyed goods and the design and size of the receiving hopper. However, the multiple metering elements do not function to shut off or to close the discharge opening in a rest position or starting position, but present suitable means for obtaining a conveyed goods flow that is as uniform and continuous as possible. The third and each further beam-shaped metering element may likewise be motor-driven about its longitudinal axis, namely preferably independently of the first and second metering elements, so that the direction of rotation and/or rotational speed and/or angle of rotation may be adjusted separately for each metering element. For example, it may be advantageous that the first and third metering elements rotate clockwise, while the second metering element rotates counterclockwise.

In one preferred embodiment, the first, second, and third and, if applicable, each additional beam-shaped metering element are arranged at different height levels or positions in the receiving hopper, i.e., the first metering element has a first height, the second metering element has a second height, and the third metering element has a third height, wherein the first, second, and third heights differ from each other. The third metering element may hereby be arranged at a horizontal distance from the first and/or second metering element. In one alternative embodiment, the third metering element may also be located at the height of the first metering element or the second metering element, however, at a distance from that metering element. The pressure relief and metering device thus has at least two, preferably three or more, metering elements. Advantageously, the longitudinal axes of the metering elements are all arranged horizontally. Furthermore, the longitudinal axes of the metering elements are arranged parallel to one another. The number of metering elements and the arrangement of the metering elements within the receiving hopper may depend on the respective application of the discharge system.

According to one preferred embodiment, the respective metering element is formed by a beam-shaped profile body with a polygonal, quadrilateral, rectangular, square, oval, semi-circular, or circular segment-shaped cross-section. It has been shown that metering elements with a non-circular or angular cross-section may act particularly effectively on the conveyed goods inside the receiving hopper. The profile bodies may thereby be designed as tubular or solid profiles, and consist at least partially of metal, plastic, in particular fiber-reinforced plastic, ceramic, titanium, or a composite material. The use of non-ferrous metals is also possible. The profile bodies may also be provided with a coating and/or have a surface profiling, such as spikes, nubs, grooves, etc.

A uniform and continuous removal of conveyed goods across the entire discharge cross-section of the discharge opening of the receiving hopper may then be guaranteed, in particular, when the conveyed goods flow or run continuously. This may be achieved in that the respective metering element may be driven to oscillate about its longitudinal axis. The oscillating movement may thereby be adjusted by a suitable controller. The metering elements advantageously carry out an oscillating movement when in the use state, wherein the oscillating movement of the respective metering element, starting from the rest position of the metering element, lies in the angular range between −135 degrees and 135 degrees, preferably between −90 degrees and 90 degrees, in particular between −60 degrees and 60 degrees. However, it is also conceivable that the respective metering element may be driven to rotate completely about its longitudinal axis.

A control unit is provided to control the metering elements, by means of which the rotational speed and/or the direction of rotation and/or the angle of rotation of the metering elements may be individually adjusted, i.e., each metering element may be controlled individually by the controller, so that the oscillation or turning or rotational movement may be independently adjusted.

For example, the turning or rotational movement of the metering elements may be controlled such that they all rotate in the same direction of rotation in the use state; however, the metering elements may also be driven in opposite directions, so that the first metering element rotates clockwise and the second metering element rotates counterclockwise. It is also possible that the at least first and second metering elements are driven at the same or different turning speeds or rotational speeds.

The discharge system preferably comprises at least one drive unit with which the metering elements may be motor-driven. The drive unit may be, for example, a stepper motor, electric motor, servo motor, or similar drive means. A drive unit is preferably provided, by means of which the metering elements are drivable, independently of one another. However, it would also be conceivable to provide an independent drive unit for each metering element.

In order to be able to convey the conveyed goods exiting or falling from the receiving hopper to further processing or treatment or work stations, such as melting furnaces with different temperature zones, the discharge system has a conveying device with at least one conveyor belt, in particular a slat conveyor belt or slat conveyor. Slat conveyors are well-suitable for use under difficult operating conditions and are suited, among other things, for lumpy and angular conveyed goods.

At least one reel shaft is positioned or arranged on the conveyor device to further homogenize or straighten out or separate the conveyed goods flow. The reel shaft is thereby arranged above the transport plane of the conveyor device, namely in such a way that the reel shaft may loosen up and separate the conveyed goods transported on the conveyor belt. The reel shaft is particularly preferably located in the output area of the conveyor belt, i.e., in the area where the conveyed goods are output from the conveyor belt. Without a reel shaft, particularly in the output area of the conveyor belt, the conveyed goods would not fall off evenly because they are often still hooked into each other. They would travel far forward on the conveyor belt and only break off very late into large clumps or tangles. This is prevented by means of the reel shaft, in that the reel shaft further separates and homogenizes the conveyed goods flow and separates interconnected conveyed goods from one another. A discharge system is provided, due to the combination of a conveying device with at least one reel shaft and a receiving hopper with the pressure relief and metering system according to the invention, which ensures a particularly high metering accuracy, in particular for conveyed goods with difficult flow properties.

The discharge system particularly preferably additionally has a positioning device, by means of which the position of at least one reel shaft may be adjusted. For this purpose, the positioning device has means by which the height of the reel shaft may be adjusted and/or the reel shaft may be displaced or moved horizontally. On the one hand, the reel shaft may be adapted to the most disparate conveyed goods by means of the positioning device, and on the other hand, the quantity of conveyed goods that is output from the conveying device may be influenced. The metering accuracy of the discharge system may thus be increased again.

The delivery system may preferably be placed on a separate substructure in the form of a subframe or frame construction. To control the discharge system, it has been shown to be advantageous that the entire bunker, including the discharge system and/or substructure, is mounted on load cells.

Further developments, advantages, and possible applications of the invention also arise from the subsequent description of exemplary embodiments and from the figures. All of the features described and/or illustrated are fundamentally the subject matter of the invention, either alone or in any combination, regardless of their combination in the claims or their dependency.

BRIEF DESCRIPTION OF THE DRAWINGS

The invention will be subsequently explained in greater detail by way of exemplary embodiments in conjunction with the drawings. As shown in.

DETAILED DESCRIPTION OF THE INVENTION

Figure 1:
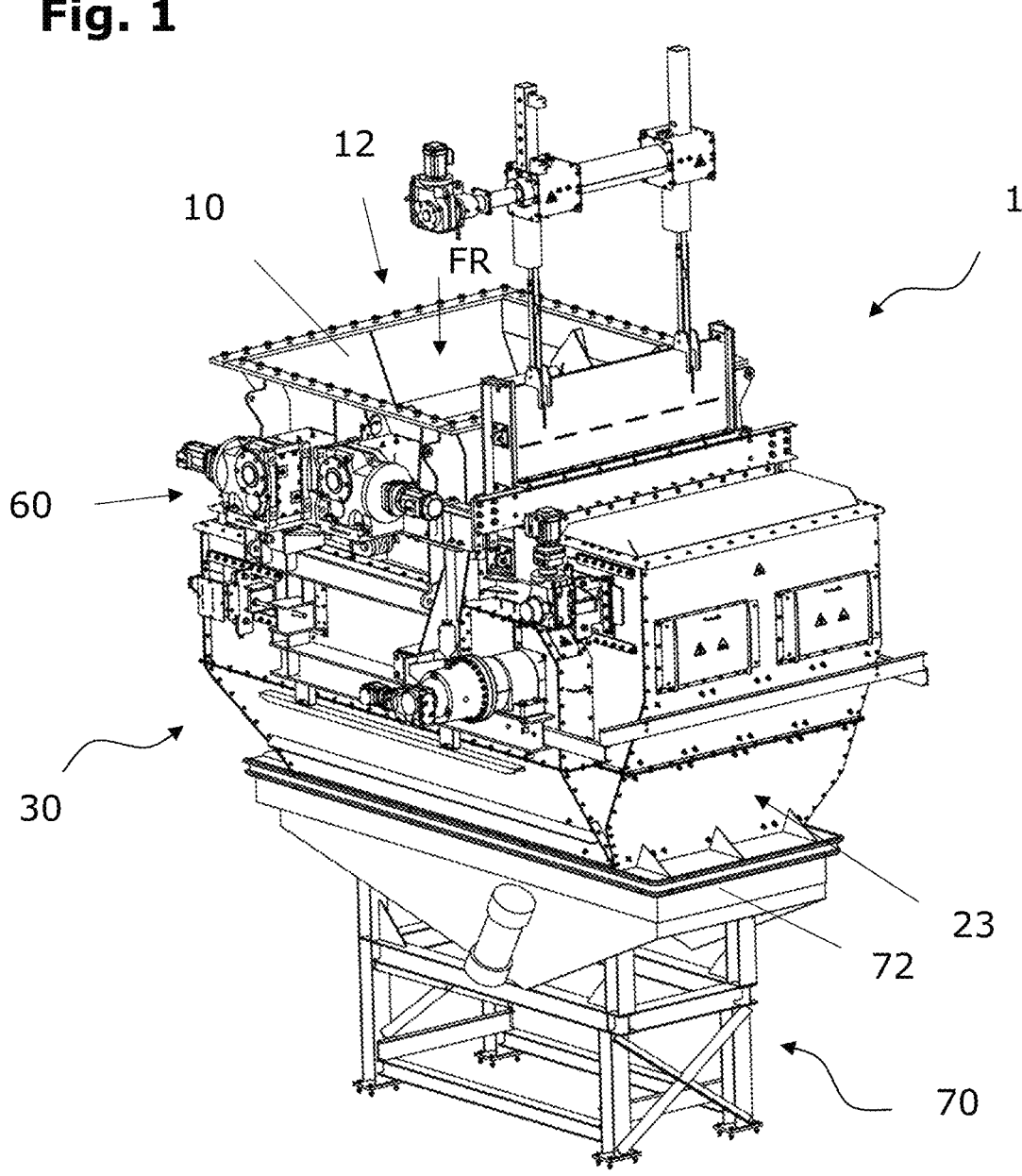
FIG. 1 is a perspective view of a discharge system according to the invention for discharging conveyed goods, in particular electrical and electronic scrap.

FIG. 1 shows a discharge system for discharging conveyed goods, in particular electrical and electronic scrap, from a bunker or bunker container. In the context of the invention, bunkers or bunker containers are storage or collection containers, preferably large containers, mostly for temporary storage or "bunkering" of conveyed goods. If a bunker is used to feed a system or a machine, a discharge device for discharging the conveyed goods from the bunker is required to discharge the conveyed goods.

In the recycling sector, particularly in sorting and/or processing plants, bunkers have established themselves due to their robustness, capacity, and design. Specific materials, such as glass, electrical and electronic scrap, packaging waste, metals, etc. are collected, stored, and unloaded into bunkers or bunker containers. During recycling, the conveyed goods unloaded from the bunker are supplied to other stations, such as sorting and/or processing systems, shredders, or melting furnaces with different heat or temperature zones. The following is applicable: the more the conveyed goods may be discharged as metered doses from the bunker by means of the discharge device, the better the conveyed goods may be processed or utilized by the subsequent stations. The metered output of the conveyed goods therefore plays a major role, in particular during the recycling of materials.

The discharge of electrical and electronic scrap, such as electronic components such as printed circuit boards, in particular, printed circuit boards with an edge length of 150 mm or less, old devices with power cables, etc., from a bunker or bunker container is particularly difficult, as these components often snag one another. The interlocking of the electrical and electronic scrap generally leads to the fact that component assemblies or clumps of the conveyed goods or tangles of conveyed goods form. As a result, a discharge system is required that may also dispense conveyed goods with difficult flow properties in a metered manner.

Discharge system 1 according to the invention consists of a receiving hopper 10, which may have any geometry. Receiving hopper 10 may be round, angular, rectangular, polygonal, square, or oval, and is preferably produced from any material, for example, metal, plastic, ceramic, or a composite material. Receiving hopper 10 functions to receive the conveyed goods from the outlet opening of the bunker or bunker container and to release it in metered doses onto conveying device 20 arranged underneath receiving hopper 10.

Figure 2:
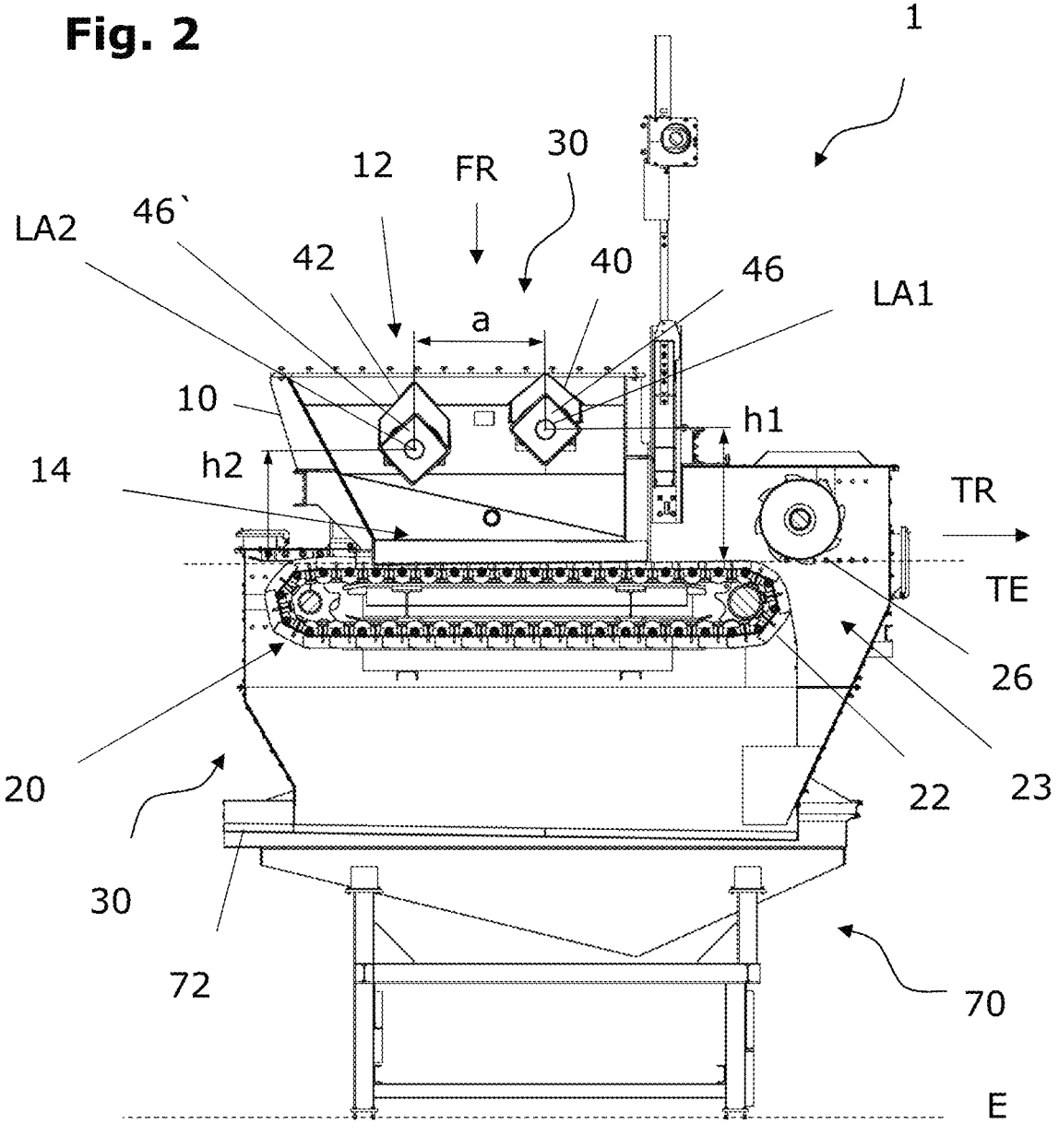
FIG. 2 is a vertical cross-section through the discharge system according to FIG. 1.

As is clear in FIG. 2, receiving hopper 10 has at least one upper feed opening 12, through which the conveyed goods may flow out of the bunker into receiving hopper 10, and a lower discharge opening 14, which is arranged on the side opposite the feed opening or on the lower side of receiving hopper 10. Accordingly, the conveyed goods flow or stream from feed opening 12 through receiving hopper 10 to discharge opening 14. In the depicted example, gravity acts on the conveyed goods, which causes the conveyed goods to flow along flow direction FR under the effect of gravity from feed opening 12 to discharge opening 14. Flow direction FR of the conveyed goods are therefore approximately vertical or perpendicular to horizontal plane E. Receiving hopper 10 preferably converges in a funnel shape along flow direction FR.

A pressure relief and metering system 30 is located in receiving hopper 10 between feed opening 12 and discharge opening 14, in particular in the area above discharge opening 14, in order to achieve pressure relief in receiving hopper 10 on the one hand, i.e., to keep the accumulation pressure in receiving hopper 10 and/or the bunker as low as possible, and on the other hand to ensure good metering of the conveyed goods. A good metering accuracy may be achieved in particular when the conveyed goods flow or the material flow exits uniformly and continuously from discharge opening 14 or falls onto conveying device 20, so that the formation of so-called dead zones in receiving hopper 10 and/or bridging in receiving hopper 10 may be avoided.

Pressure relief and metering system 30 according to the invention consists of at least one first beam-shaped metering element 40 and one second beam-shaped metering element 42, wherein first beam-shaped metering element 40 is drivable about a first longitudinal axis LA1 and second beam-shaped metering element 42 is drivable about a second longitudinal axis LA2 via a drive unit 60. Advantageously, the two metering elements 40, 42 may be designed to be driven independently of one another. In the case that metering elements 40, 42 are driven independently of one another, the most varied of drive modes may be set. For example, metering elements 40, 42 may be driven in different directions of rotation and/or at different rotational speeds, synchronously or in opposite directions to one another.

A first metering element 40 and a second metering element 42 are shown in FIG. 2 by way of example, wherein metering elements 40, 42 are designed as elongated or elongate, beam-shaped profile bodies. The profile bodies may be designed either as a tubular or a solid profile, and consist of a robust and durable material such as metal, fiber-reinforced plastic, preferably glass-fiber reinforced plastic, ceramic, or titanium.

FIG. 2 shows, by way of example, a metering element 40, 42 with a square cross-section 46, 46'. However, the cross-section 46, 46' of metering elements 40, 42 is not limited to a square cross section. Instead, polygonal or angular cross-sections 46, 46' are used, such as rectangular, hexagonal, octagonal, square, semicircular, triangular, and oval cross-sections. Cross-section 46, 46' of the respective metering elements may thereby be identical, however, first and second metering elements 40, 42 may also have a different cross-section 46, 46' which differs, for example, not only in shape but also in size.

According to the invention, first beam-shaped metering element 40 and second beam-shaped metering element 42 are arranged at a horizontal distance from one another, at different height levels or height positions in receiving hopper 10. Metering elements 40, 42 are preferably arranged parallel to one another, wherein longitudinal axes LA1, LA2 of metering elements 40, 42 respectively lie, for example, in a horizontal plane or extend in the horizontal direction. Metering elements 40, 42 are mounted or attached to be rotatable in receiving hopper 10. As may be seen in FIG. 2, first longitudinal axis LA1 of first metering element 40 and second longitudinal axis LA2 of second metering element 42 have a distance a in the horizontal direction, wherein distance a corresponds to the single, preferably doubled or tripled, cross section of one metering element. Distance a between metering elements 40, 42 is preferably selected as a function of the size, composition, type, and nature of the conveyed goods and may also be adjusted manually or by machine.

In addition to the distance between of first beam-shaped metering element 40 and second beam-shaped metering element 42 in the horizontal direction, these are arranged at different height levels or in different height positions inside receiving hopper 10. Starting from a horizontal plane E, which may be formed, for example, by the bottom plane or by the horizontally running transport plane TE of conveying device 20, metering elements 40, 42 are arranged at different height levels, i.e., first beam-shaped metering element 40 has a height h1 with respect to transport plane TE, while second beam-shaped metering element 42 has a second height h2 with respect to transport plane TE, wherein first height h1 differs from second height h2.

In the present exemplary embodiment, the height level is specified from transport plane TE, wherein first height h1 of first metering element 40 is greater than second height h2 of second metering element 42. However, the indication of the height level or the height position might be carried out analogously starting from the horizontally running floor surface, plane E. Due to the arrangement of metering elements 40, 42 at different heights, metering elements 40, 42 may act on the conveyed goods at different layer heights within receiving hopper 10. The arrangement of metering elements 40, 42 at different height levels is particularly efficient and effective in the case of existing clumps or tangles of the conveyed goods or components hooked into each other, in order to loosen the clumps and tangles of the conveyed goods and to separate components hooked into each other. The required metering accuracy of discharge system 1 may only be achieved if a uniform and preferably separated flow of conveyed material is present.

In order to prevent bridging and dead zones within receiving hopper 10, it is particularly important that the metering elements 40, 42 are motor-driven. An uninterrupted movement of the flow of the conveyed goods is achieved by the motorized movement of metering elements 40, 42 about their longitudinal axes LA1, LA2, and the conveyed goods exit uniformly from discharge opening 14 of receiving hopper 10.

Metering elements 40, 42 may, for example, thereby oscillate about their longitudinal axes LA1, LA2 during operation. The oscillating movement may be controlled by a suitable controller, wherein the angle of rotation and the speed of rotation, for example, may be influenced. Starting from the rest position of the respective metering element 40, 42, an angular range between ±135 degrees, preferably ±90 degrees, in particular ±60 degrees, has proven to be particularly effective for the oscillating movement of metering elements 40, 42. Optionally, metering elements 40, 42 may also rotate completely about their longitudinal axis LA1, LA2 during operation. The oscillating movement or the turning or rotating movement ensures a uniform and continuous removal via discharge opening 14 of the receiving hopper 10. At least one drive unit 60 is provided for driving metering elements 40, 42. Optionally, an independent drive unit 60 may be assigned to each metering element 40, 42.

Furthermore, discharge system 1 has at least one horizontally arranged conveying device 20, which is arranged underneath discharge opening 14 of receiving hopper 10 in flow direction FR and which functions to convey away the conveyed goods falling out of discharge opening 14. Conveying device 20 thereby has at least one conveyor belt 22 with a transport surface for transporting the conveyed goods, wherein the transport of the conveyed goods on the transport surface is carried out in a horizontal direction, namely along a horizontal transport plane TE in a conveying or transport direction TR. However, conveying device 20 does not necessarily have to be arranged horizontally, but may also have a slight inclination with respect to horizontal plane E. An endlessly circulating conveyor belt may be considered, in particular, as conveyor belt 22, wherein slat conveyor belts or slat conveyors are particularly suitable.

The unloaded conveyed goods are supplied to further handling or processing or treatment stations by means of conveying device 20. These stations, connected to discharge system 1 in the recycling area, may, for example, be sorting and/or processing systems, crushing systems, or melting furnaces with different heat or temperature zones.

In addition, at least one reel shaft 26 is assigned to conveying device 20 and is designed to further separate or homogenize conveyed goods that are still hooked into each other on the conveyor belt 22, so that the conveyed goods may be output from the conveyor belt evenly and with high metering accuracy. Correspondingly, reel shaft 26 is designed to separate conveyed goods that are still hooked into each other, possibly also clumps or tangles of the conveyed goods, before they are output, in that the reel shaft tears out individual conveyed goods, such as individual printed circuit boards or circuit boards, or separates them from one another.

As is clear from FIG. 2, reel shaft 26 is above conveying device 20, namely in an output area 23 of conveyor belt 22. Reel shaft 26 thereby has a longitudinal axis about which reel shaft 26 is motor-driven, wherein the longitudinal axis of reel shaft 26 is preferably aligned perpendicular to transport direction TR or parallel to transport plane TE. In order to be able to loosen and separate the entire flow of conveyed goods, reel shaft 26 extends almost over the entire width of the conveyor belt 22.

Discharge system 1 also has a positioning device, by means of which the position of at least one reel shaft 26 may be adjusted manually, semi-automatically or fully automatically. The positioning device thereby has means, by which reel shaft 26 may be adjusted in the vertical direction or in height. In addition, means may be provided with which reel shaft 26 may be moved back and forth, perpendicular to a transport direction TR of the conveyor belt, or in the longitudinal direction of reel shaft 26.

In one further embodiment, not shown in the figures, pressure relief and metering system 30 comprises at least one third beam-shaped metering element, which may likewise be motor-driven about its longitudinal axis. The third metering element may be arranged in the most varied of ways with respect to first and second metering elements 40, 42. In one preferred embodiment, the first, second, and third beam-shaped metering elements are arranged at different height levels or height positions in receiving hopper 10, i.e., first metering element 40 has a first height h1, second metering element 42 has a second height h2 and the third metering element has a third height, wherein the first, second and third heights differ from each other. Consequently, the conveyed goods are influenced by means of the metering elements at different layer heights, namely three different heights. The third metering element may thereby be arranged at a horizontal distance from first and/or second metering element 40, 42. Pressure relief and metering system 30 is not limited to two or three metering elements 40, 42; four or more beam-shaped metering elements may also be provided.

As is shown in FIGS. 1 and 2, a substructure 70 may be provided in the form of a subframe or frame construction, which has a receiving surface 72 for receiving discharge system 1 according to the invention. In order to be able to monitor and record the filling level of the bunker or bunker container, the entire bunker, including discharge system 1, may be mounted on load cells.

LIST OF REFERENCE NUMERALS

1 Discharge system
10 Receiving hopper
12 Feed opening
14 Discharge opening
20 Conveying device
22 Conveyor belt
23 Output area
24 Transport plane 26 Reel shaft
30 Pressure relief and metering system
40 First metering element
42 Second metering element
46, 46' Cross section
60 Drive unit
70 Substructure
72 Receiving surface of the substructure
FR Flow direction
TR Transport direction
TE Horizontal transport plane
LA1 First longitudinal axis
LA2 Second longitudinal axis
h1 First height
h2 Second height
a Distance
E Horizontal plane

The invention claimed is:

1. A discharge system for electrical and electronic scrap, comprising:
  a receiving hopper with an upper feed opening and a lower discharge opening located opposite the same, for receiving the electrical and electronic scrap;
  at least one horizontal conveying device arranged underneath the discharge opening for conveying away the electrical and electronic scrap exiting from the discharge opening of the receiving hopper; and
  a pressure relief and metering device for relieving the pressure in the receiving hopper and for metering and/or separating the electrical and electronic scrap, wherein the pressure relief and metering device has at least one first beam-shaped metering element and one second beam-shaped metering element, which are arranged in the receiving hopper between the feed opening and the discharge opening, in an area above the discharge opening, wherein the first beam-shaped metering element is motor-driven about a first longitudinal axis and the second beam-shaped metering element is motor-driven about a second longitudinal axis, independently of one another, and wherein the first and second beam-shaped metering elements are arranged at a horizontal distance from each other at different height levels in the receiving hopper, wherein the first beam-shaped metering element and the second beam-shaped metering element have a distance in a horizontal direction, wherein the distance in the horizontal direction is greater than a cross section of one beam-shaped metering element, corresponding to a doubled or a tripled cross section of the one beam-shaped metering element.

2. The discharge system according to claim 1, wherein the pressure relief and metering device has at least one further beam-shaped metering element.

3. The discharge system according to claim 1, wherein the first and second beam-shaped metering element have a beam-shaped profile body with a polygonal, quadrilateral, rectangular, square, oval, semi-circular or circular segment-shaped cross-section.

4. The discharge system according to claim 1, wherein the first and second beam-shaped metering element are driven to rotate completely about the respective first and second longitudinal axis.

5. The discharge system according to claim 1, wherein first and second beam-shaped metering element are driven to rotate completely about the first and second longitudinal axis.

6. The discharge system according to claim 1, wherein the discharge system has at least one drive unit with which the first and second beam-shaped metering elements are motor-driven.

7. The discharge system according to claim 1, wherein the first longitudinal axis of the first beam-shaped metering element and the second longitudinal axis of the second beam-shaped metering element are arranged in different horizontal planes and/or parallel to one another.

8. The discharge system according to claim 1, further comprising a control unit by which a rotational speed and/or a direction of rotation and/or an angle of rotation of the first and second beam-shaped metering elements are individually adjusted.

9. The discharge system according to claim 1, wherein the conveying device is arranged underneath the discharge opening and/or is formed by at least one circulating, conveyor belt and is a slat conveyor belt or slat conveyor.

10. The discharge system according to claim 1, wherein the conveying device has an output area in which at least one reel shaft is arranged for separating and/or straightening out the electrical and electronic scrap.

11. The discharge system according to claim 10, wherein a positioning device is provided for positioning a reel shaft in relation to the conveying device.

12. The discharge system according to claim 11, wherein the positioning device has an ability to adjust a height of the reel shaft and/or a horizontal alignment of the reel shaft.

* * * * *